United States Patent
Iida et al.

(10) Patent No.: US 9,618,795 B2
(45) Date of Patent: Apr. 11, 2017

(54) LIQUID CRYSTAL PANEL AND LIQUID CRYSTAL DISPLAY

(71) Applicant: NITTO DENKO CORPORATION, Ibaraki-shi, Osaka (JP)

(72) Inventors: Toshiyuki Iida, Ibaraki (JP); Nao Murakami, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 0 days.

(21) Appl. No.: 15/069,132

(22) Filed: Mar. 14, 2016

(65) Prior Publication Data
US 2016/0274400 A1   Sep. 22, 2016

(30) Foreign Application Priority Data
Mar. 17, 2015   (JP) ................................ 2015-054011

(51) Int. Cl.
*G02F 1/1335*   (2006.01)
*G02F 1/13363*   (2006.01)
*G02F 1/1343*   (2006.01)

(52) U.S. Cl.
CPC .... *G02F 1/13363* (2013.01); *G02F 1/133634* (2013.01); *G02F 1/134363* (2013.01); *G02F 2413/02* (2013.01); *G02F 2413/06* (2013.01); *G02F 2413/11* (2013.01)

(58) Field of Classification Search
CPC ........................ G02F 1/13363; G02F 1/133634
USPC .......................................................... 349/118
See application file for complete search history.

(56) References Cited

U.S. PATENT DOCUMENTS

2005/0052591 A1* 3/2005 Joten ................. G02F 1/133528
                                                        349/98
2005/0206817 A1   9/2005 Kajita et al.

FOREIGN PATENT DOCUMENTS

JP   2005-208356 A   8/2005
WO   2008/156011 A1   12/2008

* cited by examiner

*Primary Examiner* — Lucy Chien
(74) *Attorney, Agent, or Firm* — Westerman, Hattori, Daniels & Adrian, LLP

(57) ABSTRACT

The liquid crystal panel includes a liquid crystal cell, a first polarizer on one side of the liquid crystal cell, a second polarizer on the other side of the liquid crystal cell, a first optically anisotropic element disposed between the liquid crystal cell and the first polarizer, and a second optically anisotropic element disposed between the first optically anisotropic element and the liquid crystal cell. Absorption axes of the first and the second polarizers are perpendicular to each other. The first optically anisotropic element has a slow axis direction parallel to the absorption axis direction of the first polarizer. The second optically anisotropic element has a slow axis direction perpendicular to the absorption axis direction of the first polarizer. The first and the second optically anisotropic elements each have in-plane and thickness-direction retardation values within specific ranges, respectively.

8 Claims, 1 Drawing Sheet

LIQUID CRYSTAL PANEL AND LIQUID CRYSTAL DISPLAY

BACKGROUND OF THE INVENTION

Technical Field

Disclosed is a liquid crystal panel including optically anisotropic elements between a liquid crystal cell and a polarizer. A liquid crystal display including the liquid crystal panel is also disclosed.

Description of Related Art

A liquid crystal panel includes a liquid crystal cell between a pair of polarizers. In an in-plane switching (IPS) mode liquid crystal cell, liquid crystal molecules are homogeneously aligned in a direction substantially parallel to a substrate surface in a non-electric-field state, and by application of an electric field in a horizontal direction, the liquid crystal molecules are rotated in a plane parallel to the substrate surface to control right transmission (white image display) and shielding (black image display). A horizontal electric field type liquid crystal panel including liquid crystal molecules homogeneously aligned in a non-electric-field state, e.g., an IPS mode liquid crystal panel, has a small color shift in neutral colors, and is thus excellent in viewing angle characteristics.

However, when an IPS mode liquid crystal panel is viewed from an oblique direction at an angle of 45 degrees (azimuth angle of 45 degrees, 135 degrees, 225 degrees or 315 degrees) with respect to the absorption axis of a polarizer, light leakage in black image display is significant, so that a color shift and a reduction in contrast easily occur. Accordingly, a method has been proposed in which an optically anisotropic element (retarder) is disposed between a liquid crystal cell and a polarizer for the purpose of reducing a color shift and improving a contrast in an oblique viewing direction.

For example, JP 2005-208356 A describes a method for reducing black luminance and color shift of an IPS mode liquid crystal panel in an oblique direction with using a plurality of optically anisotropic elements. Reduction of black luminance and color shift in a direction at azimuth angle of 45° and polar angle (angle with respect to the normal direction of a panel surface) of 60° is explained with using a Poincare sphere. WO 2008/156011 proposes a method in which color shift in a direction at azimuth angle of 45 degrees in an IPS mode liquid crystal panel is reduced by combining an optically anisotropic element having a refractive index anisotropy of nz≥nx>ny (negative-A plate or positive-B plate) and an optically anisotropic element having a refractive index anisotropy of nx>ny>nz (negative-B plate).

By disposing a plurality of optically anisotropic elements between a liquid crystal cell and a polarizer as described above, contrast and color shift in an oblique direction can be improved. However, when optical designing is performed in such a manner that a contrast at a specific angle, e.g., azimuth angle of 45° and polar angle of 60°, becomes the maximum, light leakage (black luminance) at other angles may increase. Accordingly, for reducing the black luminance in every direction to enhance visibility, further improvement is needed. In WO2008/156011, optical designing is performed so as to reduce the color shift in a direction at an azimuthal angle of 45°, but the contrast is not sufficiently improved.

Thus, in conventional configurations, studies on improvement of visibility by enhancing the contrast in every direction have not been necessarily sufficiently done, and there is room for improvement. In view of such circumstances, an object of the present invention is to provide a liquid crystal panel and a liquid crystal display which exhibit a high contrast when viewed at any angle in an oblique direction and which have further improved visibility.

SUMMARY OF THE INVENTION

The above-mentioned object can be achieved by disposing a negative-A plate and a negative-B plate, which satisfy specific optical characteristics, between a liquid crystal cell and a polarizer.

The liquid crystal panel according to the present invention includes a liquid crystal cell, a first polarizer, a second polarizer, a first optically anisotropic element, and a second optically anisotropic element. The liquid crystal cell includes a liquid crystal layer containing liquid crystal molecules that are homogeneously aligned in a non-electric-field state. The first polarizer and the second polarizer are disposed on the first main surface side and the second main surface side of the liquid crystal cell, respectively. The first optically anisotropic element is disposed between the liquid crystal cell and the first polarizer. The second optically anisotropic element is disposed between the first optically anisotropic element and the liquid crystal cell. An absorption axis direction of the first polarizer and an absorption axis direction of the second polarizer are perpendicular to each other. A slow axis direction of the first optically anisotropic element is parallel to the absorption axis direction of the first polarizer. A slow axis direction of the second optically anisotropic element is perpendicular to the slow axis direction of the first optically anisotropic element.

The first optically anisotropic element has a ratio $Rth_1/Re_1$ ($=Nz_1$) of −0.15 to 0.15. The second optically anisotropic element has a ratio $Rth_2/Re_2$ ($=Nz_2$) of 1.5 to 2.0. The second optically anisotropic element has a thickness-direction retardation $Rth_2$ of 175 nm to 290 nm. A difference ($Re_1 - Re_2$) between an in-plane retardation $Re_1$ of the first optically anisotropic element and an in-plane retardation $Re_2$ of the second optically anisotropic element is 35 nm to 85 nm.

The first optically anisotropic element preferably has the in-plane retardation $Re_1$ of 150 nm to 220 nm and the thickness-direction retardation $Rth_1$ of −25 nm to 25 nm. The second optically anisotropic element preferably has the in-plane retardation $Re_2$ of 100 nm to 170 nm.

A sum of thickness-direction retardations ($Rth_1 + Rth_2$) between the first optically anisotropic element and the second optically anisotropic element is preferably 175 nm to 290 nm. A value of ($Rth_1 + Rth_2$)/($Re_1 - Re_2$) is preferably 2 to 8.

Herein, the first optically anisotropic element and the second optically anisotropic element have a refractive index $nx_1$ and a refractive index $nx_2$ in the in-plane slow axis direction; a refractive index $ny_1$ and a refractive index $ny_2$ in the in-plane fast axis direction; a refractive index $nz_1$ and a refractive index $nz_2$ in the thickness direction; and a thickness $d_1$ and a thickness $d_2$, respectively. In-plane retardations $Re_1$ and $Re_2$ and thickness-direction retardations $Rth_1$ and $Rth_2$ are defined as follows.

$$Re_1 = (nx_1 - ny_1) \times d_1;$$

$$Rth_1 = (nx_1 - nz_1) \times d_1;$$

$$Re_2 = (nx_2 - ny_2) \times d_2; \text{ and}$$

$$Rth_2 = (nx_2 - nz_2) \times d_2.$$

The liquid crystal panel according to the present invention includes, between a liquid crystal cell and a first polarizer, a second optically anisotropic element (negative-B plate) and a first optically anisotropic element (negative-A plate) in this order from the liquid crystal cell side. Light leakage in an oblique direction during black image display is reduced. Accordingly, even when viewed from an oblique direction, the liquid crystal panel exhibits a high contrast, and is excellent in visibility.

In the liquid crystal panel according to the present invention, it is preferable that the alignment direction of liquid crystal molecules in a non-electric-field state in the liquid crystal cell (initial alignment direction of liquid crystal) and the absorption axis direction of the first polarizer are perpendicular to each other.

The present invention also relates to a liquid crystal display including a light source on the first main surface side (first polarizer side) or the second main surface side (second polarizer side) of the liquid crystal panel. The liquid crystal display is in E-mode when it includes a light source on the first main surface side. The liquid crystal display is in O-mode when it includes a light source on the second main surface side. The liquid crystal panel according to the present invention is applicable to both of E-mode and O-mode liquid crystal displays. The O-mode liquid crystal display with a light source disposed on the second main surface side exhibits a higher contrast and is excellent in visibility.

DETAILED DESCRIPTION OF EMBODIMENTS

[Outline of Whole Liquid Crystal Panel]

Figure 1:
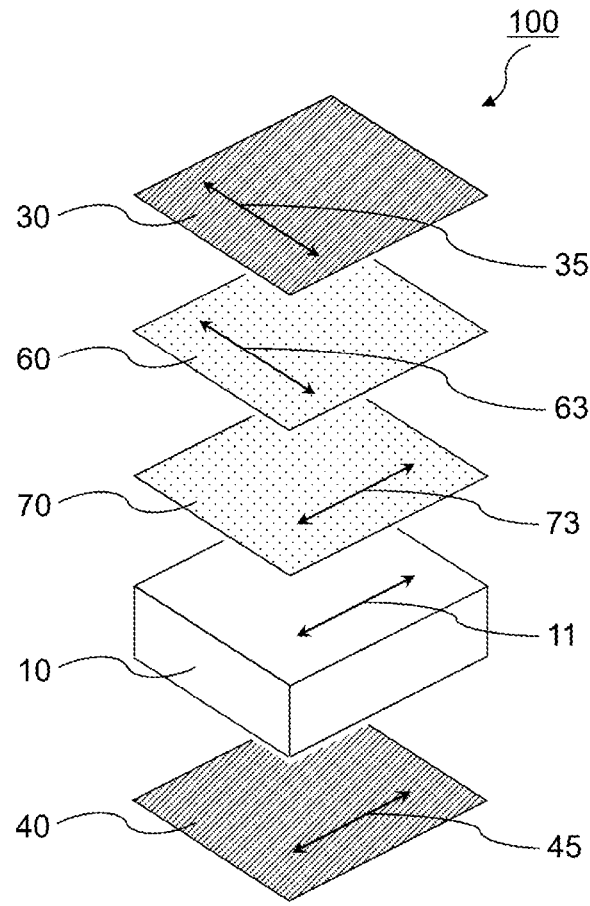
FIG. 1 is a conceptual view of a liquid crystal panel according to one embodiment of the present invention.

FIG. 1 is a conceptual view showing configuration of optical elements in a liquid crystal panel according to one embodiment. The liquid crystal panel includes a liquid crystal cell 10 having a first main surface and a second main surface. A first polarizer 30 is disposed on the first main surface side of the liquid crystal cell 10, and a second polarizer 40 is disposed on the second main surface side of the liquid crystal cell 10. Between the liquid crystal cell 10 and the first polarizer 30, a first optically anisotropic element 60 and a second optically anisotropic element 70 are disposed in this order from the first polarizer 30 side. Specifically, the liquid crystal panel according to the present invention includes the first polarizer 30, the first optically anisotropic element 60, the second optically anisotropic element 70, the liquid crystal cell 10, and the second polarizer 40 in this order from the first main surface side.

[Liquid Crystal Cell]

The liquid crystal cell 10 includes a liquid crystal layer between a pair of substrates. In a general configuration, one substrate is provided with a color filter and a black matrix, and the other substrate is provided with a switching element and the like for controlling the electro-optical characteristics of liquid crystal.

The liquid crystal layer contains liquid crystal molecules that are homogeneously aligned in a non-electric-field state. An alignment direction 11 of liquid crystal molecules in a non-electric-field state is referred to as an "initial alignment direction". The homogeneously aligned liquid crystal molecules are those in which the alignment vectors of liquid crystal molecules are aligned uniformly and parallel to a substrate surface. The homogeneous alignment also encompasses a case where the alignment vectors of liquid crystal molecules slightly tilt to the substrate surface, i.e., liquid crystal molecules have a pretilt. The pretilt angle of liquid crystal is preferably 20° or less for keeping the contrast high to obtain good display characteristics.

Examples of the liquid crystal cell having such a liquid crystal layer include in-plane switching (IPS) mode, fringe field switching (FFS) mode, ferroelectric liquid crystal (FLC) mode. As liquid crystal molecules, nematic liquid crystal, smectic liquid crystal, or the like is used. Generally, for the liquid crystal cells in IPS mode and FFS mode, nematic liquid crystal is used, and for the liquid crystal cell in FLC mode, smectic liquid crystal is used.

[Polarizer]

The first polarizer 30 is disposed in the first main surface side of the liquid crystal cell 10, and the second polarizer 40 is disposed on the second main surface side of the liquid crystal cell 10. The polarizer converts natural light and any polarized light into linearly polarized light. As the first polarizer 30 and the second polarizer 40 in the liquid crystal panel, any suitable polarizers can be employed according to a purpose. Examples of the polarizers include films obtained by uniaxially stretching a hydrophilic polymer an such as a polyvinyl alcohol-based an, a partially formulated polyvinyl alcohol-based an or an ethylene-vinyl acetate copolymer-based partially saponified an with a dichroic substance such as iodine or a dichroic dye adsorbed to the an, and polyene-based oriented films such as dehydrated products of polyvinyl alcohol and dehydrochlorinated products of polyvinyl chloride. Guest/host type polarizers obtained by unidirectionally orienting a liquid crystal composition including a dichroic substance and a liquid crystal compound as disclosed in U.S. Pat. No. 5,523,863, E type polarizers obtained by unidirectionally orienting lyotropic liquid crystal as disclosed in U.S. Pat. No. 6,049,428, and so on may also be used.

Among these polarizers, ones having high degree of polarization such as polyvinyl alcohol (PVA)-based polarizers are preferably used. PVA-based film may be a polyvinyl alcohol film or a partially formulated polyvinyl alcohol film. PVA-based polarizer is oriented PVA-based film with a dichroic substance such as iodine or a dichroic dye adsorbed thereinto. PVA-based polarizer can be obtained, for example, by iodine-dying and stretching a polyvinyl alcohol-based film.

As the PVA-based polarizer, a thin polarizer having a thickness of 10 μm or less may also be used. Examples of the thin polarizer include thin polarizers as described in JP 51-069644 A, JP 2000-338329 A, WO 2010/100917, JP 4691205 B, JP 4751481 B, and so on. These thin polarizers are obtained by, for example, a production method including the steps of stretching a laminate of PVA-based resin layer and a stretchable resin base material; and performing iodine dying to the PVA-based resin layer.

In the liquid crystal panel according to the present invention, the first polarizer 30 and the second polarizer 40 are disposed in such a manner that absorption axis directions 35 and 45 of both the polarizers are perpendicular to each other. The absorption axis direction 35 of the first polarizer 30 and the initial alignment direction 11 of the liquid crystal cell 10 are parallel or perpendicular to each other. Preferably, the absorption axis direction 35 of the first polarizer 30 and the initial alignment direction 11 of the liquid crystal cell 10 are perpendicular to each other as shown in FIG. 1.

In this specification, the term "perpendicular" encompasses not only being completely perpendicular, but also being substantially perpendicular, and the angle thereof is generally within 90±2°, preferably within 90±1°, more preferably within 90±0.5°. Similarly, the term "parallel" encompasses not only being completely parallel, but also being substantially parallel, and the angle thereof is generally within ±2°, preferably ±1°, more preferably within ±0.5°.

[First Optically Anisotropic Element and Second Optically Anisotropic Element]

The liquid crystal panel according to the present invention includes, between the liquid crystal cell 10 and the first polarizer 30, the first optically anisotropic element 60 and the second optically anisotropic element 70 in this order from the first polarizer 30 side. A slow axis direction 63 of the first optically anisotropic element 60 is parallel to the absorption axis direction 35 of the first polarizer 30. A slow axis direction 73 of the second optically anisotropic element 70 is perpendicular to the absorption axis direction 35 of the first polarizer 30. Accordingly, the slow axis direction 63 of the first optically anisotropic element 60 and the slow axis direction 73 of the second optically anisotropic element 70 are perpendicular to each other.

The first optically anisotropic element 60 is a negative-A plate that satisfies the relationship of $nx_1=nz_1>ny_1$. $nx_1$ is a refractive index in the in-plane slow axis direction, $ny_1$ is a refractive index in the in-plane fast axis direction, and $nz_1$ is a refractive index in the thickness direction. For the description of "$nx_1=nz_1$" in the negative-A plate, the refractive index $nx_1$ in the in-plane slow axis direction and the refractive index $nz_1$ in the thickness direction are not necessarily required to be completely equal to each other as long as $Nz_1$ represented by the ratio $Rth_1/Re_1$ of the in-plane retardation $Re_1$ and the thickness-direction retardation $Rth_1$ falls within the range of −0.15 to 0.15. $Nz_1$ is preferably −0.1 to 0.1, more preferably −0.05 to 0.05. The black luminance of the liquid crystal panel in an oblique direction tends to decrease as $Nz_1$ becomes closer to 0.

The in-plane retardation $Re_1$ of the first optically anisotropic element 60 is preferably 150 nm to 220 nm, more preferably 155 nm to 210 nm, further preferably 160 nm to 200 nm. When $Re_1$ falls within the above-mentioned range, the value of $Re_1-Re_2$ can be adjusted to fall within a range as described later, so that a liquid crystal panel having small light leakage in an oblique direction is obtained. In this specification, the refractive index and the retardation are values at a wavelength of 590 nm.

The thickness-direction retardation $Rth_1$ represented by a product of the difference between $nx_1$ and $nz_1$ and the thickness $d_1$ in the first optically anisotropic element is preferably in the range of −25 nm to 25 nm. $Rth_1$ is preferably −20 nm to 20 nm, further preferably −15 nm to 15 nm, particularly preferably −10 nm to 10 nm.

The second optically anisotropic element 70 is a negative-B plate that satisfies the relationship of $nx_2>ny_2>nz_2$. $nx_2$ is a refractive index in the in-plane slow axis direction, $ny_2$ is a refractive index in the in-plane fast axis direction, and $nz_2$ is a refractive index in the thickness direction. The ratio of the in-plane retardation $Re_2$ and the thickness-direction retardation $Rth_2$ in the second optically anisotropic element ($Nz_2=Rth_2/Re_2$) is 1.5 to 2.0. In the present invention, a liquid crystal panel having small light leakage in an oblique direction is obtained by disposing the negative-A plate as the first optically anisotropic element and the negative-B plate as the second optically anisotropic element with $Nz_2$ in a specific range in such a manner that the slow axis directions of both the plates are perpendicular to each other. $Nz_2$ is preferably 1.55 to 1.95, more preferably 1.6 to 1.9.

The thickness-direction retardation $Rth_2$ of the second optically anisotropic element 70 is 175 nm to 290 nm. Preferably, $Rth_2$ is 180 nm to 270 nm. The in-plane retardation $Re_2$ of the second optically anisotropic element 70 is preferably 95 nm to 175 nm, more preferably 100 nm to 170 nm. When $Re_2$ falls within the above-mentioned range, $Nz_2$ of the second optically anisotropic element can be made to fall within the above-mentioned range, and the value of $Re_1-Re_2$ can be adjusted to fall within a range as described later, so that a liquid crystal panel having small light leakage in an oblique direction is obtained.

The difference between the in-plane retardation $Re_1$ of the first optically anisotropic element 60 and the in-plane retardation $Re_2$ of the second optically anisotropic element 70 ($Re_1-Re_2$) is 35 nm to 85 nm. The slow axis direction 63 of the first optically anisotropic element 60 and the slow axis direction 73 of the second optically anisotropic element 70 are perpendicular to each other, and therefore when a laminate of the first optically anisotropic element and the second optically anisotropic element is considered as one optical element, the difference between the in-plane retardations of both the optically anisotropic elements ($Re_1-Re_2$) is equivalent to an apparent in-plane retardation of the laminated optical element. When this value falls within the above-mentioned range, a liquid crystal panel having small light leakage in an oblique direction is obtained. The value of $Re_1-Re_2$ is preferably 40 nm to 85 nm, further preferably 45 nm to 80 nm.

The sum of the thickness-direction retardation $Rth_1$ of the first optically anisotropic element 60 and the thickness-direction retardation $Rth_2$ of the second optically anisotropic element 70, i.e., $Rth_1+Rth_2$ is preferably 175 nm to 290 nm, more preferably 180 nm to 270 nm. When a laminate of the first optically anisotropic element and the second optically anisotropic element is considered as one optical element, the value of $Rth_1+Rth_2$ is equivalent to an apparent thickness-direction retardation of the laminated optical element. Since the first optically anisotropic element 60 is a negative-A plate, and $Rth_1$ is substantially zero, the value of $Rth_1+Rth_2$ is substantially equal to $Rth_2$.

The ratio of the difference in in-plane retardation ($Re_1-Re_2$) and the sum of thickness-direction retardations ($Rth_1+Rth_2$) between the first optically anisotropic element 60 and the second optically anisotropic element 70 (($Rth_1+Rth_2$)/($Re_1-Re_2$)) is preferably 2 to 8, more preferably 2.5 to 7.

In the present invention, by ensuring that the optical anisotropy of each of the first optically anisotropic element and the second optically anisotropic element, which are disposed between the liquid crystal cell 10 and the polarizer 30, is in the above-mentioned range, the black luminance in an oblique direction, particularly at an angle of 45 degrees (azimuth angle of 45 degrees, 135 degrees, 225 degrees or 315 degrees) with respect to the absorption axis of the polarizer can be reduced to enhance the contrast.

As long as the first optically anisotropic element and the second optically anisotropic element satisfy the above-mentioned optical characteristics, the materials and methods for production thereof are not particularly limited. As the materials of the first optically anisotropic element and the second optically anisotropic element, polymer materials, liquid crystal materials and so on are preferably used.

When a polymer material is used as the material of the optically anisotropic element, a polymer excellent in transparency, mechanical strength and heat stability is preferably used. By stretching a polymer film to enhance the molecular orientation in a specific direction, an optically anisotropic element (retardation film) can be formed. Examples of the method for stretching a polymer film include a longitudinal uniaxial stretching method, a lateral uniaxial stretching method, a longitudinal and lateral sequential biaxial stretching method and a longitudinal and lateral simultaneous biaxial stretching method. Any suitable stretching machine such as a roll stretching machine, a tenter stretching machine, or a pantograph-type or a linear motor-type biaxial stretching machine can be used for stretching the film.

Since the first optically anisotropic element is a negative-A plate that satisfies the relationship of $nx_1=nz_1>ny_1$, it is preferable that a negative birefringence polymer is used as a material thereof. The term "negative birefringence polymer" means that when a polymer is oriented by stretching etc., the refractive index in the orientation direction becomes relatively small, and in other words, the refractive index in a direction perpendicular to the orientation direction becomes large. Such a polymer is, for example, one including a chemical bond or functional group having large polarization anisotropy, such as an aromatic or carbonyl group, on polymer side chain. Specific examples of the negative birefringence polymer include acryl-based resins, styrene-based resins, maleimide-based resins, and fumaric acid esters.

Since the second optically anisotropic element is a negative-B plate that satisfies the relationship of $nx_2>ny_2>nz_2$, it is preferable that a positive birefringence polymer is used as a material thereof. The term "positive birefringence polymer" means that when a polymer is oriented by stretching etc., the refractive index in the orientation direction becomes relatively large. Most kinds of the polymers are positive birefringence polymer, and examples thereof include cellulose-based resins such as acetyl cellulose, polycarbonate-based resins, polyester-based resins such as polyethylene terephthalate and polyethylene naphthalate; polyarylate-based resins, polyimide-based resins, cyclic polyolefin-based (polynorbornene-based) resins, polyamide resins, and polyolefin-based resins such as polyethylene and polypropylene.

When a liquid crystal material is used as a material of the optically anisotropic element, the liquid crystal material (liquid crystal monomer and/or liquid crystal polymer) is applied onto a base material, and polymerization of the liquid crystal monomer, orientation of the liquid crystal material, removal of the solvent (drying) and so on are performed as necessary to form a liquid crystal layer, whereby an optically anisotropic element is obtained. As the liquid crystal monomer, a liquid crystal compound having at least one unsaturated double bond such as an acryloyl group, a methacryloyl group or a vinyl group, or at least one polymerizable functional group such as an epoxy group at the end and showing an orientation property such as a nematic or smectic orientation is used. The liquid crystal material containing a liquid crystal monomer may include a polymerization initiator in addition to the liquid crystal monomer. Examples of the method for polymerizing a polymerizable liquid crystal monomer include thermal polymerization and ultraviolet polymerization, and an appropriate polymerization initiator is used according to a polymerization method. As the liquid crystal polymer, a main chain type liquid crystal polymer or a side chain type liquid crystal polymer each showing a liquid crystal orientation such as a nematic or smectic liquid crystal orientation, or a liquid crystal compound composed of a combination of these liquid crystal polymers is used. The molecular weight of the liquid crystal polymer is not particularly limited, and is preferably about 2000 to 100000 in terms of a weight average molecular weight.

A base material with a liquid crystal layer formed thereon may be directly used as an optically anisotropic element. For example, a liquid crystal layer having a negative refractive index anisotropy, such as discotic liquid crystal layer, is formed as the first optically anisotropic element on the second optically anisotropic element to obtain a laminated optically anisotropic element in which the second optically anisotropic element (negative-B plate) and the first optically anisotropic element (negative-A plate) are integrally laminated. A laminated optically anisotropic element can also be obtained by transferring a liquid crystal layer (optically anisotropic element) formed on a base material onto other optically anisotropic element.

The thickness $d_1$ of the first optically anisotropic element and the thickness $d_2$ of the second optically anisotropic element can be each appropriately selected according to a material that forms the optically anisotropic element, etc. When a polymer material is used, the thickness of each optically anisotropic element is generally about 3 μm to 200 μm. When a liquid crystal material is used, the thickness of each optically anisotropic element (thickness of the liquid crystal layer) is generally about 0.1 μm to 20 μm.

[Configuration of Optical Members]

The liquid crystal panel according to the present invention can be prepared by disposing the second optically anisotropic element 70, the first optically anisotropic element 60 and the first polarizer 30 on the first main surface side of the liquid crystal cell 10, and disposing the second polarizer 40 on the second main surface side of the liquid crystal cell 10.

An optically isotropic film as a polarizer protective film may also be provided between the first polarizer 30 and the first optically anisotropic element 60 or between the second polarizer 40 and the liquid crystal cell 10. By providing a polarizer protective film on a surface of the polarizer, durability of the polarizer can be enhanced. The optically isotropic film to be used as a polarizer protective film is one that does not substantially change the polarized state of light which transmits in any of the normal direction and the oblique direction. Specifically, the optically isotropic film has an in-plane retardation Re of preferably 10 nm or less and a thickness-direction retardation Rth of preferably 20 nm or less. The in-plane retardation of the optically isotropic film is more preferably 5 nm or less. The thickness-direction retardation of the optically isotropic film is more preferably 10 nm or less, further preferably 5 nm or less.

The liquid crystal panel according to the present invention may include an optical layer other than that described above, and other members. For example, it is preferable to provide a polarizer protective film on the outer surface (surface that does not face the liquid crystal cell 10) of each of the first polarizer 30 and the second polarizer 40. The polarizer protective film to be provided on the outer surface of the polarizer may be optically isotropic, or may be optically anisotropic. The polarizer protective film to be provided on a surface of the first polarizer 30 on the liquid crystal cell 10 side and the polarizer protective film to be provided on the liquid crystal cell 10 side of the second polarizer 40 are required to be optically isotropic as described above. Preferably, the liquid crystal panel according to the present invention does not include an optical anisotropic element other than the first optically anisotropic element and the second optically anisotropic element between the first polarizer 30 and the liquid crystal cell 10, and does not include an optically anisotropic element between the second polarizer 40 and the liquid crystal cell 10.

The liquid crystal cell and the above-mentioned optical members are laminated to form a liquid crystal panel. In fabrication process of the liquid crystal panel, the members may be sequentially and separately laminated on the liquid crystal cell, or a laminated film obtained by laminating some members beforehand may be used. The order of laminating these optical members is not particularly limited. Preferably, the first polarizer 30, the first optically anisotropic element 60 and the second optically anisotropic element 70 are laminated to form a laminated polarizing plate 80 beforehand, and the laminated polarizing plate 80 is bonded to the liquid crystal cell 10 with a pressure sensitive adhesive (not illustrated) interposed therebetween. As described above, an optically isotropic film as a polarizer protective film may be provided between the first polarizer 30 and the first optically anisotropic element 60.

An adhesive or a pressure sensitive adhesive is preferably used for laminating the members. As the adhesive or pressure sensitive adhesive, one having as a base polymer an acryl-based polymer, a silicone-based polymer, polyester, polyurethane, polyamide, polyvinyl ether, a vinyl acetate/vinyl chloride copolymer, a modified polyolefin, an epoxy-based polymer, a fluorine-based polymer, a rubber-based polymer or the like can be appropriately selected and used.

[Liquid Crystal Display]

Figure 2:
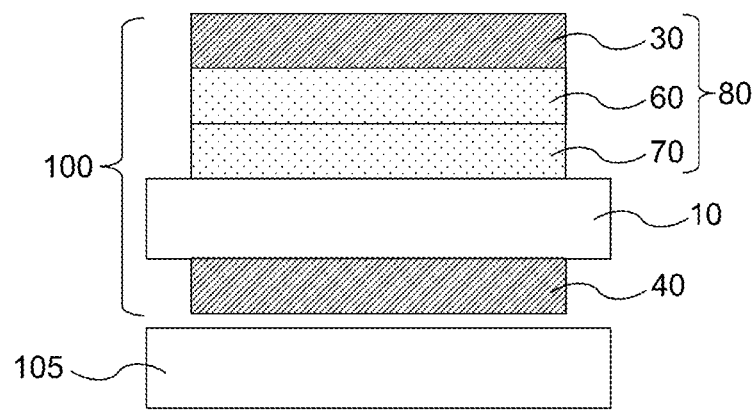
FIG. 2 is a schematic sectional view of a liquid crystal display according to one embodiment of the present invention.

A liquid crystal display is formed by arranging a light source on the first main surface side (first polarizer 30 side) or the second main surface side (second polarizer 40 side) of the liquid crystal panel. When a light source is arranged on the first main surface side, the absorption axis direction 35 of the polarizer on the light source side (first polarizer 30) and the initial alignment direction 11 of the liquid crystal cell 10 are perpendicular to each other, and therefore the liquid crystal display is in E-mode. As shown in FIG. 2, when a light source 105 is arranged on the second main surface side, the absorption axis direction 45 of the polarizer on the light source side (second polarizer 40) and the initial alignment direction 11 of the liquid crystal cell 10 are parallel to each other, and therefore the liquid crystal display is in O-mode.

A liquid crystal panel 100 according to the present invention can be used in either of E-mode and O-mode. In O-mode, the contrast tends to be further enhanced because linearly polarized light transmitting through the second polarizer 40 is directly incident to the liquid crystal cell 10 without being affected by the optically anisotropic element.

A brightness enhancement film (not illustrated) may also be provided between the liquid crystal panel and the light source. The brightness enhancement film may be laminated with the polarizer on the light source side. For example, in the O-mode liquid crystal display, a brightness enhancement film may be bonded to the outer surface of the second polarizer on the light source side with an adhesive layer interposed therebetween. A polarizer protective film may be provided between the polarizer and the brightness enhancement film.

EXAMPLES

Hereinafter, the present invention will be described in detail by showing comparison between Examples and Comparative Examples, but the present invention is not limited to these examples.

Examples 1 to 11 and Comparative Examples 1 to 20

Simulation was conducted using as a simulation model an O-mode liquid crystal display including a polarizer, an IPS liquid crystal cell (in-plane retardation: 322 nm; pretilt angle: 0.1°), a second optically anisotropic element, a first optically anisotropic element and a polarizer in this order from the light source side. The configuration of the optically anisotropic elements was as shown in FIG. 1. The wavelength dispersion in the retardation of the first optically anisotropic element was set to R450/R550 (ratio of retardation at a wavelength of 450 nm to retardation at a wavelength of 550 nm)=1.11 and R650/R550 (ratio of retardation at a wavelength of 650 nm to retardation at a wavelength of 550 nm)=0.97, the wavelength dispersion in the retardation of the second optically anisotropic element was set to R450/R550=1.01 and R650/R550=1.00, and the in-plane retardation Re and the thickness-direction retardation Rth of each of the optically anisotropic element were changed to make an evaluation.

For simulation, a liquid crystal display device simulator "LCD MASTER Ver. 6.084" manufactured by SHINTECH, INC was used. The luminance (black luminance) in black image display at each of azimuth angles of 45°, 135°, 225° and 315° and a polar angle of 60° was calculated using the extension function of LCD Master, and the maximum value of the luminance (black luminance) was determined.

Comparative Example 21

The order of arrangement of the first optically anisotropic element and the second optically anisotropic element in Example 1 was reversed. The second optically anisotropic element (negative-B plate with the slow axis direction being perpendicular to the absorption axis direction of the viewing-side polarizer), the first optically anisotropic element (negative-A plate with the slow axis direction being parallel to the absorption axis direction of the viewing-side polarizer), the liquid crystal cell and polarizer on the light source side are disposed in this order from the viewing-side polarizer, and simulation was conducted.

Comparative Example 22

Any of the first optically anisotropic element and the second optically anisotropic element was not used, the viewing-side polarizer, the liquid crystal cell and the polarizer on the light source side were disposed in this order, and simulation was performed.

[Evaluation Results]

The optical characteristics of optically anisotropic elements and simulation results (maximum value of black luminance) in Examples and Comparative Examples are shown in Table 1.

TABLE 1

| | Polarizer side (first optically anisotropic element) | | | Cell side (second optically anisotropic element) | | | Re₁ − Re₂ (nm) | Rth₁ + Rth₂ (nm) | (Rth₁ + Rth₂)/ (Re₁ − Re₂) | black luminance |
|---|---|---|---|---|---|---|---|---|---|---|
| | Re₁ (nm) | Rth₁ (nm) | Nz₁ | Re₂ (nm) | Rth₂ (nm) | Nz₂ | | | | |
| Example 1 | 180 | 0 | 0 | 110 | 187 | 1.70 | 70 | 187 | 2.67 | 0.21 |
| Comparative Example 1 | 180 | 0 | 0 | 90 | 153 | 1.70 | 90 | 153 | 1.70 | 0.59 |
| Example 2 | 180 | 0 | 0 | 105 | 189 | 1.80 | 75 | 189 | 2.52 | 0.18 |
| Example 3 | 180 | 0 | 0 | 130 | 221 | 1.70 | 50 | 221 | 4.42 | 0.43 |
| Comparative Example 2 | 180 | 0 | 0 | 160 | 272 | 1.70 | 20 | 272 | 13.60 | 1.81 |
| Comparative Example 3 | 180 | 0 | 0 | 110 | 110 | 1.00 | 70 | 110 | 1.57 | 5.16 |
| Comparative Example 4 | 180 | 0 | 0 | 110 | 154 | 1.40 | 70 | 154 | 2.20 | 1.12 |
| Comparative Example 5 | 180 | 0 | 0 | 110 | 165 | 1.50 | 70 | 165 | 2.36 | 0.70 |
| Example 4 | 180 | 0 | 0 | 110 | 209 | 1.90 | 70 | 209 | 2.99 | 0.21 |
| Example 5 | 180 | 0 | 0 | 110 | 220 | 2.00 | 70 | 220 | 3.14 | 0.39 |
| Comparative Example 6 | 180 | 0 | 0 | 110 | 231 | 2.10 | 70 | 231 | 3.30 | 1.73 |
| Comparative Example 7 | 180 | 0 | 0 | 125 | 263 | 2.10 | 55 | 263 | 4.78 | 3.24 |
| Comparative Example 8 | 140 | 0 | 0 | 110 | 187 | 1.70 | 30 | 187 | 6.23 | 1.22 |
| Example 6 | 160 | 0 | 0 | 110 | 187 | 1.70 | 50 | 187 | 3.74 | 0.25 |
| Example 7 | 160 | 0 | 0 | 105 | 189 | 1.80 | 55 | 189 | 3.44 | 0.35 |
| Comparative Example 9 | 220 | 0 | 0 | 110 | 187 | 1.70 | 110 | 187 | 1.70 | 1.16 |
| Comparative Example 10 | 180 | −90 | −0.50 | 110 | 187 | 1.70 | 70 | 97 | 1.39 | 3.93 |
| Comparative Example 11 | 180 | −36 | −0.20 | 110 | 187 | 1.70 | 70 | 151 | 2.16 | 0.96 |
| Example 8 | 180 | −18 | −0.10 | 110 | 187 | 1.70 | 70 | 169 | 2.41 | 0.49 |
| Example 9 | 180 | 18 | 0.10 | 110 | 187 | 1.70 | 70 | 205 | 2.93 | 0.35 |
| Comparative Example 12 | 180 | 36 | 0.20 | 110 | 187 | 1.70 | 70 | 223 | 3.19 | 0.76 |
| Comparative Example 13 | 180 | 90 | 0.50 | 110 | 187 | 1.70 | 70 | 277 | 3.96 | 3.40 |
| Comparative Example 14 | 90 | 0 | 0 | 90 | 153 | 1.70 | 0 | 153 | — | 3.41 |
| Comparative Example 15 | 138 | −14 | −0.1 | 60 | 90 | 1.50 | 78 | 76 | 0.97 | 2.39 |
| Comparative Example 16 | 150 | 0 | 0 | 90 | 170 | 1.89 | 60 | 170 | 2.83 | 0.54 |
| Comparative Example 17 | 150 | −15 | −0.1 | 100 | 160 | 1.60 | 50 | 145 | 2.90 | 1.53 |
| Comparative Example 18 | 150 | −38 | −0.25 | 120 | 185 | 1.54 | 30 | 147 | 4.90 | 1.85 |
| Example 10 | 190 | 0 | 0 | 135 | 203 | 1.50 | 55 | 203 | 3.68 | 0.37 |
| Example 11 | 210 | 0 | 0 | 170 | 255 | 1.50 | 40 | 255 | 6.38 | 0.29 |
| Comparative Example 19 | 210 | 0 | 0 | 150 | 195 | 1.30 | 60 | 195 | 3.25 | 1.07 |
| Comparative Example 20 | 210 | 0 | 0 | 180 | 306 | 1.70 | 30 | 306 | 10.20 | 1.86 |
| Comparative Example 21 | 110 | 187 | 1.7 | 180 | 0 | 0 | 70 | 187 | 2.67 | 11.85 |
| Comparative Example 22 | — | | | — | | | — | | | 4.30 |

As shown in Table 1, it is apparent that in Comparative Examples 1 to 22, the maximum value of the black luminance exceeds 0.5, whereas in Examples 1 to 11, the maximum value of the black luminance is less than 0.5. It is apparent that displays of the Examples show small black luminance and high contrast even when viewed from an oblique direction.

Comparison between Examples 1, 8 and 9 and Comparative Examples 10 to 13 shows that when the first optical element disposed on the polarizer side is a negative-A plate having a refractive index anisotropy with Nz close to 0, i.e., nz≈nx>ny, the black luminance in an oblique direction is reduced. Comparison between Examples 1, 4 and 5 and Comparative Examples 3 to 7 shows that when the second optical element disposed on the cell side is a negative-B plate having a refractive index anisotropy with nx>ny>nz and having Nz in a specific range, the black luminance in an oblique direction is reduced.

It is apparent that in Comparative Example 21 where the arrangement order of the negative-A and the negative-B plate is reversed, the black luminance in an oblique direction is larger than that in Comparative Example 22 where the optically anisotropic element is not present. It is apparent from these results that by disposing a negative-A plate as the first optically anisotropic element on the polarizer side and disposing a negative-B plate as the second optically anisotropic element on the liquid crystal cell side, the black luminance in an oblique direction can be reduced, and the order of laminating the optically anisotropic elements is important.

Comparison between Examples 1 to 3 and Comparative Examples 1 and 2 and comparison between Examples 1, 6 and 7 and Comparative Examples 8 and 9 show that when the difference in in-plane retardation between the first optically anisotropic element and the second optically anisotropic element ($Re_1-Re_2$) falls within a specific range, the black luminance is reduced. As described earlier, the value $Re_1-Re_2$ is equivalent to an apparent in-plane retardation of the laminated optical element where two optically anisotropic elements with their slow axis directions being perpendicular to each other.

From the above results, it is apparent that a liquid crystal panel having a small black luminance in an oblique direction can be obtained when the negative-B plate and the negative-A plate are disposed in this order from the liquid crystal cell side in such a manner that the slow axis directions of both the plates are perpendicular to each other, the optical characteristics of the plates each fall within a specific range, and the difference in in-plane retardation between both the plates falls within a specific range.

What is claimed is:

1. A Liquid crystal panel comprising:
   a liquid crystal cell including a liquid crystal layer containing liquid crystal molecules that are homogeneously aligned in a non-electric-field state;
   a first polarizer disposed on a first main surface side of the liquid crystal cell;
   a second polarizer disposed on a second main surface side of the liquid crystal cell;
   a first optically anisotropic element disposed between the liquid crystal cell and the first polarizer; and
   a second optically anisotropic element disposed between the first optically anisotropic element and the liquid crystal cell, wherein
   the first polarizer has an absorption axis direction perpendicular to an absorption axis direction of the second polarizer,
   the first optically anisotropic element has a slow axis direction parallel to the absorption axis direction of the first polarizer,
   the second optically anisotropic element has a slow axis direction perpendicular to the absorption axis direction of the first polarizer,
   a ratio $Rth_1/Re_1$ of an in-plane retardation $Re_1$ and a thickness-direction retardation $Rth_1$ in the first optically anisotropic element is −0.15 to 0.15,
   the second optically anisotropic element has a thickness-direction retardation $Rth_2$ of 175 nm to 290 nm, and a ratio $Rth_2/Re_2$ of an in-plane retardation $Re_2$ and a thickness-direction retardation $Rth_2$ in the second optically anisotropic element is 1.5 to 2.0,
   a value of $Re_1-Re_2$ is 35 nm to 85 nm,
   where the first optically anisotropic element and the second optically anisotropic element have a refractive index $nx_1$ and a refractive index $nx_2$ in the in-plane slow axis direction; a refractive index $ny_1$ and a refractive index $ny_2$ in the in-plane fast axis direction; a refractive index $nz_1$ and a refractive index $nz_2$ in the thickness direction; and a thickness $d_1$ and a thickness $d_2$, respectively, and the following relationships are satisfied:

$$Re_1=(nx_1-ny_1)\times d_1;$$

$$Rth_1=(nx_1-nz_1)\times d_1;$$

$$Re_2=(nx_2-ny_2)\times d_2; \text{ and}$$

$$Rth_2=(nx_2-nz_2)\times d_2.$$

2. The liquid crystal panel according to claim 1, wherein the first optically anisotropic element has the in-plane retardation $Re_1$ of 150 nm to 220 nm.

3. The liquid crystal panel according to claim 1, wherein the second optically anisotropic element has the in-plane retardation $Re_2$ of 100 nm to 170 nm.

4. The liquid crystal panel according to claim 1, wherein the first optically anisotropic element has the thickness-direction retardation $Rth_1$ of −25 nm to 25 nm.

5. The liquid crystal panel according to claim 1, wherein a value of $Rth_1+Rth_2$ is 175 nm to 290 nm.

6. The liquid crystal panel according to claim 1, wherein a value of $(Rth_1+Rth_2)/(Re_1-Re_2)$ is 2 to 8.

7. The liquid crystal panel according to claim 1, wherein an alignment direction of liquid crystal molecules in a non-electric-field state in the liquid crystal cell and the absorption axis direction of the first polarizer are perpendicular to each other.

8. A liquid crystal display device comprising: the liquid crystal panel according to claim 1; and a light source on the first main surface side or the second main surface side of the liquid crystal panel.

* * * * *